United States Patent [19]

Nissley et al.

[11] Patent Number: 5,705,231
[45] Date of Patent: Jan. 6, 1998

[54] METHOD OF PRODUCING A SEGMENTED ABRADABLE CERAMIC COATING SYSTEM

[75] Inventors: David M. Nissley, Marlborough; Harold D. Harter, Manchester, both of Conn.; Daniel R. Godin, East Waterboro, Me.; George E. Foster, Dudley, Mass.

[73] Assignee: United Technologies Corporation, Hartford, Conn.

[21] Appl. No.: 685,284

[22] Filed: Jul. 23, 1996

Related U.S. Application Data

[62] Division of Ser. No. 534,146, Sep. 26, 1995.

[51] Int. Cl.$^6$ ........................................ C23C 4/10
[52] U.S. Cl. .................. 427/453; 427/454; 427/419.3; 427/422; 427/427
[58] Field of Search ........................... 427/453, 454, 427/419.3, 422, 427

[56] References Cited

U.S. PATENT DOCUMENTS

| Re. 33,876 | 4/1992 | Goward et al. | 428/633 |
|---|---|---|---|
| 3,975,165 | 8/1976 | Elbert et al. | 29/182.2 |
| 4,142,022 | 2/1979 | Erickson et al. | 428/432 |
| 4,269,903 | 5/1981 | Clingman et al. | 428/591 |
| 4,291,089 | 9/1981 | Adamovic | 428/325 |
| 4,377,371 | 3/1983 | Wisander et al. | 415/174 |
| 4,379,812 | 4/1983 | Sara | 428/577 |
| 4,405,284 | 9/1983 | Albrecht et al. | 415/174 |
| 4,405,659 | 9/1983 | Strangman | 427/248.1 |
| 4,450,184 | 5/1984 | Longo et al. | 427/34 |
| 4,457,948 | 7/1984 | Ruckle et al. | 427/34 |
| 4,481,237 | 11/1984 | Bosshart et al. | 427/376.4 |
| 4,503,130 | 3/1985 | Bosshart et al. | 428/632 |
| 4,588,607 | 5/1986 | Matarese et al. | 427/34 |
| 4,599,270 | 7/1986 | Rangaswamy et al. | 428/402 |
| 4,639,388 | 1/1987 | Ainsworth et al. | 428/117 |
| 4,822,689 | 4/1989 | Fukubayashi et al. | 428/472 |
| 4,861,618 | 8/1989 | Vine et al. | 427/34 |
| 4,936,745 | 6/1990 | Vine et al. | 415/173.4 |
| 5,073,433 | 12/1991 | Taylor | 428/134 |
| 5,236,787 | 8/1993 | Grassi | 428/552 |
| 5,350,599 | 9/1994 | Rigney et al. | 427/255.7 |

FOREIGN PATENT DOCUMENTS

| 0017944 | 10/1980 | European Pat. Off. | C23C 7/00 |
|---|---|---|---|
| 0605196 | 7/1994 | European Pat. Off. | C23C 4/10 |
| 63-274751 | 11/1988 | Japan | C23C 4/06 |
| 2060436 | 5/1981 | United Kingdom | B05D 1/06 |

OTHER PUBLICATIONS

On The Development Of Plasma–Sprayed Thermal Barrier Coating, R. Sivakumar and M.P. Srivastave, Oxidation of Metals, vol. 20, Nos. 3/4 1983.

Experience With McRal And Thermal Barrier Coatings Produced Via Inert Gas Shrouded Plasma Deposition, T.A. Taylor, M.P. Overs, B.J. Gill, and R.C. Tucker, Jr., J. Vac. Sci. Technol. A 3 (6), Nov./Dec. 1985 pp. 2526–2531.

Thermal Properties And Microstructure Of Two Thermal Barrier Coatings, Thomas A. Taylor, Surface and Coatings Technology, 54/55 (1992) 53–57.

(List continued on next page.)

*Primary Examiner*—Benjamin Utech
*Attorney, Agent, or Firm*—Brooks Haidt Haffner & Delahunty

[57] ABSTRACT

A method of producing a segmented abradable ceramic coating system having superior abradability and erosion resistance is disclosed. The system includes a duct segment having a metallic substrate, a MCrAlY bond coat on the substrate and a segmented abradable ceramic coating on the bond coat. The segmented abradable ceramic coating includes a base coat foundation layer, a graded interlayer and an abradable top layer for an overall thickness of preferably about 50 mils (1.270 mm). The coating is characterized by a plurality of vertical microcracks. By precisely controlling the deposition parameters, composition of the layers and layer particle morphology, segmentation is achieved, as well as superior abradability and erosion resistance.

4 Claims, 1 Drawing Sheet

OTHER PUBLICATIONS

Thermal Fatigue of Plasma Sprayed $MgO \cdot ZrO_2$ and $ZrO_2$–6.6$Y_2O_3$ Thermal Barrier Coatings, T.A. Taylor, M.O. Price, R.C. Tucker, Jr., May 4, 1982.

AIAA–80–1193 Development Of Improved–Durability Plasma Sprayed Ceramic Coatings For Gas Turbine Engines, I.E. Sumner, NASA Lewis Research Center, Cleveland, Ohio and D. Ruckle, Pratt & Whitney Aircraft, East Hartford, Conn., Jun. 30–Jul. 2, 1980/Hartford CT.

Plasma–Sprayed Yttria–Stabilized Zirconia Coatings: Structure–Property Relationships, T.A. Taylor et al., Surface and Coatings Technology, 43/44 (1990) 470–480.

A Study Of The Effects Of Variations In Parameters On The Strength And Modulus Of Plasma Sprayed Zirconia, H.E. Eaton and R.C. Novak, Surface and Coatings Technology, 27 (1986) pp. 257–267.

Mechanical Behavior Of Segmented Oxide Protective Coatings, J.W. Patten, J.T. Prater, D.D. Hays, R.W. Moss, J.W. Fairbanks, Thin Solid Films, 73(1980) 463–470.

METHOD OF PRODUCING A SEGMENTED ABRADABLE CERAMIC COATING SYSTEM

This is a division of copending application Ser. No. 08/534,146 filed on Sep. 26, 1995 pending.

BACKGROUND OF THE INVENTION

1. Technical Field

This invention relates generally to duct segments for use in gas turbine engines, and particularly to ceramic abradable coatings for such duct segments.

2. Background Information

Modern gas turbine engines, particularly those used in aircraft, operate at high rotational speeds and high temperatures for increased performance and efficiency. The turbine of a mode gas turbine engine is typically of an axial flow design and includes a plurality of axial flow stages. Each axial flow stage comprises a plurality of blades mounted radially at the periphery of a disk which is secured to a shaft. A plurality of duct segments surround the stages to limit the leakage of gas flow around the tips of the blades. These duct segments are located on the inner surface of a static housing or casing. The incorporation of the duct segments improves thermal efficiency because more work may be extracted from gas flowing through the stages as opposed to leaking around the blade tips.

Although the duct segments limit the leakage of gas flow around the blade tips, they do not completely eliminate the leakage. It has been found that even minor amounts of gas flow around the blade tips detrimentally affect turbine efficiency. Thus, gas turbine engine designers proceed to great lengths to devise effective sealing structures. These structures generally include a coated duct segment in combination with a blade tip coating which renders the tips resistant to wear. In operation, the tips provide sealing by cutting into the coating on the duct segment.

Unfortunately current duct segment coatings, which are typically ceramic, suffer from excessive material loss as a result of erosion or spalling. In general, erosion is the wearing away of coating material due to factors such as abrasion and corrosion. Erosion often results from particle impingement during engine operation. Spalling is typically caused by delamination cracking at the ceramic-metal interface resulting from thermal stress and the aggressive thermal environment. Spalling is essentially piecemeal coating loss consisting of many small coherent volumes of coating material. Ceramic coating loss increases blade tip clearance and thus is detrimental to turbine efficiency, as well as detrimental to the blades themselves. For example, the blades may become damaged due to the increased temperature at which the engine must then operate to make up for lost thrust.

Accordingly, there exists a need for a coating which is abradable as well as erosion and spalling resistant. This coating is necessary for a sealing system having superior abradability and erosion resistance.

DISCLOSURE OF INVENTION

The present invention is directed towards providing a coating which is abradable as well as erosion and spalling resistant.

An aspect of the invention includes a segmented abradable ceramic coating system having enhanced abradability. The system comprises a duct segment including a metallic substrate; a MCrAlY bond coat on the substrate; and a segmented abradable ceramic (SAC) coating on the MCrAlY bond coat. The nature of the MCrAlY bond coat is such that it must provide sufficient resistance to oxidation and corrosion. One aspect of the SAC coating comprises three ceramic layers which include a base coat foundation layer of material selected from the group consisting of zirconia stabilized with ceria, zirconia stabilized with magnesia, zirconia stabilized with calcia, zirconia stabilized with yttria, and mixtures thereof; an abradable top layer comprising zirconia; and a graded interlayer which is a compositional blend of the base coat foundation layer and the abradable top layer. The graded interlayer is positioned between the base coat foundation layer and the abradable top layer. The segmented abradable ceramic coating also includes a plurality of vertical microcracks and the three ceramic layers comprise powder particles which are spherical and hollow (prior to deposition) for increased abradability.

Another aspect of the invention includes a segmented abradable sealing system having enhanced abradability relative to segmented sealing systems known in the art. The sealing system comprises a duct segment including a metallic substrate; a MCrAlY bond coat on the substrate; and a segmented abradable ceramic coating on the MCrAlY bond coat. The system also includes a cooperating interacting turbine component having an abrasive coating on a portion thereon such that the abrasive coating can interact with the segmented abradable ceramic coating to provide sealing.

Yet another aspect of the invention includes a method of making a segmented abradable ceramic coating. By precisely controlling the deposition parameters and utilizing specific powder compositions and powder morphology, segmentation of the coating into vertical microcracks is achieved as well as superior abradability and erosion resistance.

An advantage of the present invention is segmentation of the coating into columnar type cells thereby significantly improving ceramic spalling resistance. The novel plasma spray processing parameters of the present invention produce ceramic segmentation which enhances erosion resistance and results in superior abradability.

The foregoing and other features and advantages of the present invention will become more apparent from the following description and accompanying drawings.

BEST MODE FOR CARRYING OUT THE INVENTION

Figure 1:
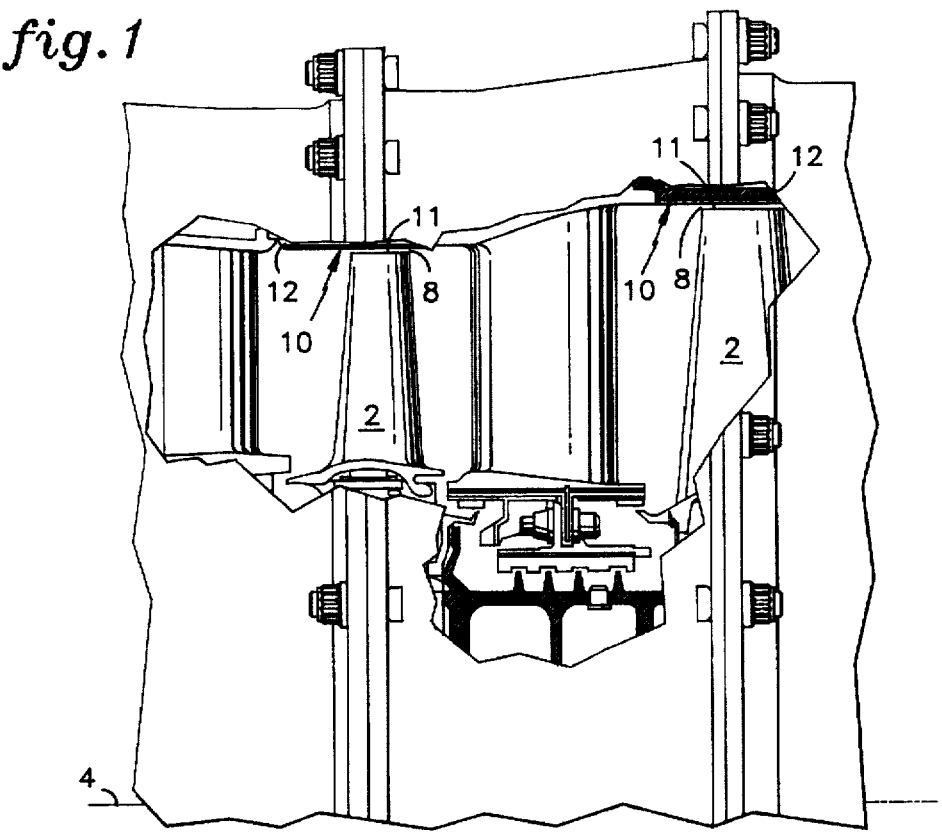
FIG. 1 shows a cross-section of a portion of a modem gas turbine engine with a coated flow path duct segment of the present invention positioned therein.

As shown in FIG. 1, a plurality of blades 2 mounted on a disk rotate about an axis of rotation 4 in the turbine section of a gas turbine engine. A static housing, concentric with the axis of rotation 4, surrounds the blades 2. A gap 8 exists between the housing and tips 11 of blades 2.

During gas turbine engine operation, high temperature gas flows between the rotating turbine blades 2. The turbine must efficiently convert the energy of this high temperature gas into shaft horsepower to drive a compressor. Thus, gas leakage through gap 8 must be minimized because minute changes in tip clearance have a great adverse effect on gas turbine engine performance.

Figure 2:
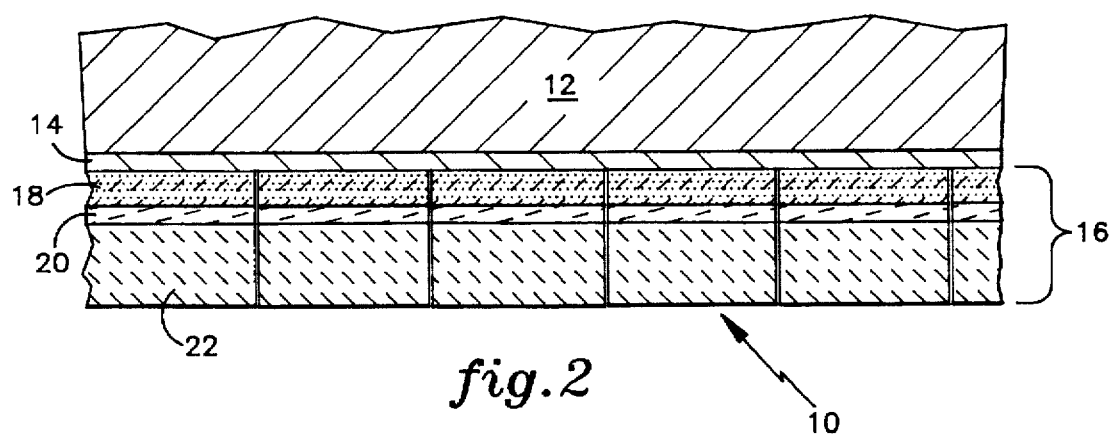
FIG. 2 shows a coated flow path duct segment of the present invention in detail.

Accordingly, a flow path duct segment 10 is provided between the blade tips 11 and the housing. As shown in FIG. 2, the flow path duct segment 10 includes a substrate or seal shoe 12 which is made of a nickel or cobalt base superalloy and is typically fabricated by casting and machining. The substrate 12 is located on the inner wall of the housing.

An abradable ceramic coating system is applied to the substrate 12. Prior to depositing the coating system, the substrate 12 may be cleaned to remove contamination. Cleaning is conventional and may include aluminum oxide grit blasting.

A bond coat 14 of an MCrAlY material is applied to the substrate 12. MCrAlY refers to known metal coating systems in which M denotes nickel, cobalt, iron, or mixtures thereof; Cr denotes chromium; Al denotes aluminum; and Y denotes yttrium. MCrAlY materials are often known as overlay coatings because they are put down in a predetermined composition and do not interact significantly with the substrate during the deposition process. For examples of MCrAlY materials see U.S. Pat. No. 3,528,861 which describes a FeCrAlY coating as does U.S. Pat. No. 3,542,530. In addition, U.S. Pat. No. 3,649,225 describes a composite coating in which a layer of chromium is applied to a substrate prior to the deposition of a MCrAlY coating. U.S. Pat. No. 3,676,085 describes a CoCrAlY overlay coating while U.S. Pat. No. 3,754,903 describes a NiCoCrAlY overlay coating having particularly high ductility. U.S. Pat. No. 4,078,922 describes a cobalt base structural alloy which derives improved oxidation resistance by virtue of the presence of a combination of hafnium and yttrium. A preferred MCrAlY bond coat composition is described in U.S. Pat. No. 32,121, which is assigned to the present Assignee and incorporated herein by reference, as having a weight percent compositional range of 5–40 Cr, 8–35 Al, 0.1–2.0 Y, 0.1–7 Si, 0.1–2.0 Hf, balance selected from the group consisting of Ni, Co and mixtures thereof. See also U.S. Pat. No. 4,585,481, which is also assigned to the present Assignee and incorporated herein by reference.

This MCrAlY bond coat 14 may be applied by any method capable of producing a dense, uniform, adherent coating of desired composition. For example, techniques such as sputtering, electron beam physical vapor deposition and high velocity plasma spray techniques are known. In the latter technique, a spray torch may operate in a vacuum chamber at a pressure of less than about 60 torr (60 mm Hg) or in another suitable atmosphere, such as air. If a vacuum chamber is employed, the substrate is heated to a temperature between about 1500° F. (816° C.) and about 1900° F. (1038° C.). If an air atmosphere is used, the substrate temperature is maintained at less than about 600° F. (316° C.). Preferably, however, the bond coat is applied by a process known as high velocity oxy-fuel (HVOF) spray. This deposition process utilizes a spray torch in which fluid fuel or gas is combusted with oxygen to produce a high velocity gas stream into which powdered coating material is injected, heated and propelled onto the part. This process is effective as well as cost efficient.

The particle size for the bond coat 14 may be between about 15 microns (0.015 mm) and about 60 microns (0.060 mm), with preferably a mean particle size of about 25 microns (0.025 mm). The bond coat may be applied to a thickness between about 5 mils (0.127 mm) and about 10 mils (0.254 mm). Preferably the thickness is between about 6 mils (0.152 mm) and about 7 mils (0.178 mm).

Next a segmented abradable ceramic (SAC) coating 16 is applied on bond coat 14. The SAC coating 16 comprises three ceramic layers which are individually applied for an overall thickness between about 20 mils (0.508 mm) and about 75 mils (1.905 mm), preferably about 50 mils (1.270 mm). The SAC coating 16 is typically produced in one continuous spray process. However, three separate spray events may be employed.

In a suitable setup for deposition of the above described layers, a plurality of bondcoated substrates 12 are loaded into a hollow cylindrical fixture such that the bondcoated surfaces face the inner diameter of the cylindrical fixture. A plasma spray gun is positioned in the interior of the cylindrical fixture for depositing the layers.

First, a base coat foundation layer 18 is applied to bond coat 14 to a thickness of between about 5 mils (0.127 mm) and about 15 mils (0.381 mm). Layer 18 is preferably a yttria partially stabilized zirconia ceramic layer (yttria partially stabilized zirconia herein refers to a composition of about 12 weight percent or less yttria stabilized zirconia). However, a composition of between about 6 weight percent and about 20 weight percent yttria stabilized zirconia may be used, with a preferred range between about 7 weight percent and about 12 weight percent yttria stabilized zirconia for material strength. Similarly, other zirconia based compositions, such as ceda stabilized zirconia, magnesia stabilized zirconia, calcia stabilized zirconia and mixtures thereof may be substituted for the yttria stabilized zirconia. A blended layer having a combination of about 7 weight percent yttria stabilized zirconia and other yttria stabilized zirconia powders may also be employed.

The particle size of the powder used for layer 18 (as well as the powder used for subsequently applied layer 20 and layer 22) may range from about 5 microns (0.005 mm) to about 175 microns (0.175 mm) with a preferred particle size of about 50 microns (0.050 mm) in mean diameter. The particles for layer 18, as well as for layers 20 and 22, are produced from a spray dried and sintered process which results in spherical and hollow powders, as opposed to fused and crushed powders which are angular and solid. In general, the initial step of the spray dried and sintered process includes mixing raw zirconia and yttria to a desired weight percent ratio. This mixture is then combined with water (and conventional binders) to produce a slip. The slip is then fed into a spray dryer which partially dries the slip by spraying the material into a heated chamber, thereby producing spherical and hollow powders. Then the material is heated at the sintering temperature in a furnace for typically between about 4 hours and about 8 hours. This sintering temperature therein is usually about 60% to about 70% of the theoretical melting point of zirconium oxide.

Alternatively, a spray dried and plasma densifted process may be used, although this process may be more expensive than the above described process. In general, the initial step of this process also includes mixing raw zirconia and yttria to a desired weight percent ratio. This mixture is then also combined with water (and conventional binders) to produce a slip. The slip is then fed into a spray dryer which partially dries the slip by spraying the material into a heated chamber, thereby producing spherical and hollow powder. Following the spray drying step, however, the powder is then fed through a plasma spray gun where the yttria and zirconia melt to produce a homogeneous composition.

The spherical and hollow morphology of the powder prior to deposition is a key factor for the success of the present invention, especially with respect to its Superior abradability. For example, if solid particles are present in the powder, more heat is required to melt the powder. This results in a dense coating which may not be very abradable. Also, the deposition efficiency for angular and solid particles is less relative to spherical and hollow particles. This is extremely important for manufacturing cost concerns.

Layer 18, the base coat foundation layer, is beneficial to the success of the segmented abradable coating system because it provides a tough ceramic structure, starts segmentation of the deposited material into vertical microcracks, provides erosion protection and provides a thermal barrier benefit. In addition, layer 18 bonds to the MCrAlY bond coat 14.

Layer 18 is typically plasma sprayed in air. It may be desirable to heat the substrate 12 and monitor the temperature at less than about 600° F. (316° C.) to help segmentation of the material into vertical microcracks. This heating may be accomplished by application of heat to the back side of the substrate 12 during material deposition. The above described heating parameters apply to layer 18, as well as to the other subsequently applied layers. Preferably, however, the substrate 12 is not heated except incidentally during spraying.

The processing parameters of the present invention are controlled to produce vertical segmentation (approximately perpendicular to the bond coat surface) and are specific to variables such as gun type and fixture geometry. In general, we have found that a close gun to part spray distance coupled with relatively high power deposition results in desirable vertical segmentation of between about 4 and about 8 microcracks per inch. The parameters described herein were specifically tailored for use with a Sulzer Metco, Inc. 3MB air plasma spray gun and a cylindrical fixture having a 30 inch (0.76 m) diameter. One of ordinary skill in the art would appreciate that the parameters may vary with the use of a different spray gun and/or fixture. Accordingly, the parameters set forth herein may be used as a guide for selecting other suitable parameters for different operating conditions.

Specifically, during the spray deposition of layer 18, the cylindrical fixture rotates at a speed between about 5 rpm and about 25 rpm, and preferably at about 12 rpm. The plasma spray gun is located in the interior of the hollow cylindrical fixture. The gun to part angle during individual part coating is between about 80 degrees and about 100 degrees, and preferably about 90 degrees. The gun to part distance is varied in increments from about a nominal 2 inches (0.05 m) (starting distance) to about a nominal 5 inches (0.13 m) (end distance), and preferably between about 2.75 inches (0.07 m) (starting distance) and about 3.25 inches (0.083 m) (end distance) during production of layer 18. This close gun distance is necessary for satisfactory vertical segmentation. Gun traverse speed across each part during deposition is between about 1 in/min (0.03 m/min) and about 5 in/min (0.13 m/min), preferably about 4.4 in/min (0.11 m/min).

Powder feed rate is between about 15 grams/min and about 50 grams/min, and preferably about 35 grams/min. Carrier gas flow, such as nitrogen, is used to maintain the powder under pressure and facilitate powder feed. The flow rate is between about 5 scfh (standard cubic feet/hour) (0.14 scmh (standard cubic meters/hour) and about 20 scfh (0.57 scmh), preferably about 11 scfh (0.31 scmh). Standard conditions are herein defined as about room temperature (25° C.) and about one atmosphere of pressure (101 kPa). Primary gas flow, such as nitrogen gas, in the gun is between about 80 scfh (2.27 scmh) and about 120 scfh (3.40 scmh), and preferably about 99 scfh (2.80 scmh). Similarly, secondary gas flow, such as hydrogen, in the gun is between about 5 scfh (0.14 scmh) and about 30 scfh (0.85 scmh), and preferably about 18 scfh (0.51 scmh). Gun voltage is between about 60 volts and about 80 volts, and preferably about 75 volts. Similarly, gun amperage is between about 700 amps and about 900 amps, and preferably about 736 amps. We have found the above described parameters to be optimum for the deposition process using the Sulzer Metco 3MB plasma spray gun, but one skilled in the art would appreciate that the parameters are dependent on variables, including but not limited to, powder type, powder size and especially type of gun.

Next a graded interlayer 20 is applied to base coat foundation layer 18 to a thickness between about 3 mils (0.076 mm) and about 10 mils (0.254 mm). This layer is also typically plasma sprayed in air. The composition of the graded interlayer 20 is a blend of layer 18 (base coat foundation layer) and layer 22, which is an abradable top coat subsequently applied to layer 20. For ease of describing the composition of graded interlayer 20, the composition of layer 22 will now be described. Layer 22 is an abradable top layer comprising zirconia. The nature of layer 22 is such that it must be soft enough to allow blade tips to cut into layer 22 and provide sealing. The composition of layer 22 is typically a blend of 7 weight percent yttria stabilized zirconia and 20 weight percent yttria stabilized zirconia. The ratio of the blend depends on the desired characteristics of the resulting deposit. For example, if increased erosion resistance is desired, then an increase in the amount of 7 weight percent yttria stabilized zirconia should be employed, whereas if an increase in abradability is desired, then more 20 weight percent yttria stabilized zirconia should be added. However, in another embodiment essentially 100% of zirconia fully stabilized with yttria, such as 20 weight percent yttria stabilized zirconia, may be employed for layer 22.

The composition of graded interlayer 20 is typically varied from a starting composition of a weight percent ratio of layer 18/layer 22 to a final composition of a weight percent ratio of layer 18/layer 22. For example, we have employed a starting composition of 90/10 (weight percent ratio of layer 18 to layer 22) to a final composition of 10/90 (weight percent ratio of layer 18 to layer 22).

The deposition parameters for production of layer 20 are the same as those previously described for production of layer 18, except that in this case, preferably the gun to part distance is held constant at about 3.25 inches (0.083 m). It may be possible to vary the gun to part distance within the ranges described for production of layer 18, but we have found that keeping the distance constant is optimum. The advantage of this graded interlayer is that it provides a strength link between layer 18 and layer 22.

It should also be noted that the graded layer 20 may also be produced by other means, such as by application of individual layers of layer 18 and layer 22, varied by pass.

After application of the graded layer 20, the above described abradable layer 22 is sprayed on the graded interlayer 20 to a thickness between about 15 mils (0.381 mm) and about 55 mils (1.397 mm). Preferably, the thickness of layer 22 is about 35 mils (0.889 mm). The deposition parameters for production of layer 22 are the same as those described for production of layer 20.

Porosity may be intentionally created within layer 22 by adding small amounts of materials such as polyester or Lucite™ powder. The inclusion of about 1 to about 7 weight percent polyester powder (60 micron (0.060 mm) nominal particle size) in layer 22 may produce a porosity on the order of about 20–30 volume percent. High porosity levels, such as levels greater than about 25 volume percent, may be unsatisfactory because of potential erosion of the coating. However, since a dense structure is desired for erosion resistance, addition of these materials should be minimized, if not eliminated entirely. It is desirous for the resultant density of layer 22 to be between about 90–95 percent theoretical.

In an alternative embodiment of the present invention, layer 22 may comprise alternating layers of a layer of 20 weight percent yttria stabilized zirconia and a layer of blended 7 weight percent yttria stabilized zirconia and 20 weight percent yttria stabilized zirconia (such as a 50–50 blend) for an overall thickness of preferably about 35 mils (0.889 mm). The thickness of the layers may be between about 0.5 mils (0.013 mm) and about 5 mils (0.127 nm) each. Each layer should be about the same thickness.

In another embodiment of the invention, other materials, including but not limited to ceria, magnesia, calcia or mixtures thereof may be employed in place of yttria for the SAC system. However, yttria stabilized zirconia materials are recommended for SAC applications exceeding 1950° F. (1066° C.).

In another embodiment of the invention, alumina (99.0% purity) may be employed. For example, a thin layer (less than about 5 mils (0.127 mm)) of alumina may be sprayed on the bond coat 14 prior to application of layer 18. Alternatively, a blended composition of alumina and less than about 12 weight percent yttria stabilized zirconia may be used for the base coat foundation layer 18 (less than 10 weight percent alumina blend). The thin alumina layer may also be applied upon completion of layer 18 and prior to application of layer 20.

In yet another embodiment of the invention, the SAC coating may consist essentially of layer 22. This coating would be desirable for military applications. Due to the smaller size of military gas turbine engine components, a thinner SAC coating is acceptable.

After application of the SAC coating, the flow path duct segment 10 is usually heat treated for stress relief. Specifically, the duct segment 10 may be heat treated at about 1975° F. (1079° C.)+/–25° F. (14° C.), for about 4 hours and then force cooled to about 1100° F. (593° C.) in about 22 minutes or less. The segment 10 is then force cooled to about 1000° F. (538° C.) in about 7 minutes or less and again force cooled to below 300° F. (149° C.). This heat treatment preserves or even increases the useful life of the duct segment 10. For example, spallation of the coating is reduced. This heat treatment may also be employed after deposition of layer 14 (bond coat) and prior to deposition of the foundation layer 18, although it is not necessary for practice of the present invention.

The above described coating system is particularly suited to interact with blade tips which are coated on their free end with an abrasive material, including but not limited to cubic boron nitride. This interaction provides an effective sealing system.

The present invention will now be described by example which is meant to be exemplary rather than limiting.

EXAMPLE

Nickel based high pressure turbine duct segments which were previously coated with a NiCoCrAlY oxidation resistant bondcoat were loaded into a hollow cylindrical fixture having a 30 inch (0.76 m) diameter such that the bond coated surface of the duct segments faced the center of the fixture. The HVOF process previously described was used to apply the NiCoCrAlY bondcoat to the duct segments.

A Sulzer Metco, Inc. 3MB air plasma spray gun was positioned in the interior of the fixture which rotated at about 12 rpm. The gun was located at about a 90 degree angle to the inside surface of each duct segment to be coated in turn. Three distinct layers were created on the bondcoated duct segments using the parameters set forth in Table 1 below. The layers were deposited in one continuous spray process to avoid any potential weak links in the overall coating due to momentarily stopping the process. This continuous process was possible with the use of several Miller Thermal Model 1250 powder feeders, each containing powder having a specific composition. The powders also had a spherical and hollow morphology prior to deposition. The feeders can be computer controlled to deposit the desired composition for each layer. Specifically, layer I, a base coat foundation layer, 0.010 inches (0.254 mm) to 0.015 inches (0.381 mm) thick of between about 6 weight percent and about 8 weight percent yttrium oxide, remainder zirconium oxide (Sulzer Metco, Inc. 204NS powder) was deposited. Next, layer 2, a graded interlayer of varied composition from 90 weight percent layer 1/10 weight percent layer 3 (starting composition) to 10 weight percent layer 1/90 weight percent layer 3 (end composition) was deposited. The grading was performed in 8 uniform steps over a layer thickness of 0.005 inches (0.013 mm) at a constant gun distance of 3.25 inches (0.083 m), as noted in Table 1 below. Layer 3, an abradable top layer, was then deposited to a thickness between about 0.025 inches (0.635 mm) and 0.040 inches (1.016 mm). The composition of layer 3 was a 50—50 blend of 1) the composition of layer 1 and 2) between about 18.5 weight percent and about 21.50 weight percent yttrium oxide, remainder zirconium oxide (Sulzer Metco, Inc. 202 powder or equivalent). A multi-layer segmented abradable coating having between about 4 and about 8 vertical microcracks per inch resulted.

TABLE I

|  | Layer 1 | Layer 2 | Layer 3 |
|---|---|---|---|
| fixture rotation speed (rpm) | 12 | 12 | 12 |
| gun traverse speed across ca. scal (in/min) | 4.4 | 4.4 | 4.4 |
| gun to scal distance (in) |  |  |  |
| start | 2.75 | 3.25 | 3.25 |
| end | 3.25 | 3.25 | 3.25 |
| gun to seal angle (degrees) | 90 | 90 | 90 |
| gun voltage (volts) | 75 | 75 | 75 |
| primary gas flow, N$_2$(scfh) | 99 | 99 | 99 |
| secondary gas flow, H$_2$(scfh) | 18 | 18 | 18 |
| gun amperage (amps) | 736 | 736 | 736 |
| carrier gas flow, N$_2$(scfh) | 11 | 11 | 11 |
| powder feed rate (grams/min) | 35 | 35 | 35 |

An advantage of the present invention is its superior abradability as compared to a segmented coating having a composition of 7 weight percent yttria, balance substantially zirconia (7 YSZ). This superior abradability of the present invention results, in part, because 7 YSZ contains approximately equivalent proportions of tetragonal $ZrO_2$ and cubic $ZrO_2$. Tetragonal $ZrO_2$ is stronger than cubic $ZrO_2$ due to its lattice structure. Thus, 7 YSZ is a strong, effective erosion resistant material. However, 20 weight percent yttria, balance substantially zirconia (20 YSZ) does not contain tetragonal $ZrO_2$ (only cubic $ZrO_2$), and thus is more abradable (i.e. sorer). As stated previously, 20 YSZ is a desirable composition for the abradable top layer 22. In a duct segment application, effective abradability is an essential requirement for efficient engine operation. Different material combinations can be selected for specific engine models having different needs. For example, a SAC coating with less abradability and more erosion resistance can be selected, if desired. In such a case, SAC coating may comprise a blend of 7 YSZ and 20 YSZ as the abradable layer (layer 22). The blend would provide the needed erosion resistance (from the 7 YSZ) without sacrificing abradability. An important point to remember is that the segmented abradable coating of the present invention, with its unique structure and variety of material combinations, can be tailored for engine specific duct segment applications. The three layer approach provides a means of tailoring the long-term thermal insulation benefit provided by the initial layers (layer 18 and layer 20) and the abradability benefit provided by the top layer (layer 22) in a given engine application.

Although the invention has been shown and described with respect to detailed embodiments thereof, it should be understood by those skilled in the art that various changes in form and detail may be made without departing from the spirit and scope of the invention. Specifically, although the present invention has been described as a segmented abradable ceramic coating for aircraft gas turbine engine duct segments, the present invention may have other potential applications, including but not limited to, a thermal barrier coating on gas turbine engine components, such as vanes, and as a segmented abradable ceramic coating system for land based turbine applications. The present invention may also have application in the automotive industry as a coating for automotive engine components, such as pistons.

What is claimed is:

1. A method of producing a segmented abradable ceramic coating system including a base coat foundation layer, a graded interlayer, and an abradable top layer, said method comprising:

applying the base coat foundation layer on a MCrAlY bondcoated metallic substrate using a spray gun, said base coat foundation layer comprising a layer of material selected from the group consisting of zirconia stabilized with ceria, zirconia stabilized with magnesia, zirconia stabilized with calcia, zirconia stabilized with yttria, and mixtures thereof, wherein the distance between the gun and surface to be coated is varied in increments from a starting distance of about 2 inches to an end distance of about 5 inches during deposition of the base coat foundation layer to produce the base coat foundation layer having a thickness of between about 5 mils and about 15 mils;

applying the graded interlayer on the base coat foundation layer using a spray gun, said graded interlayer comprising a compositional blend of the base coat foundation layer and the abradable top layer; wherein the distance between the gun and surface to be coated is held constant during deposition of the graded interlayer to produce the graded interlayer having a thickness of between about 3 mils and about 10 mils; and applying the abradable top layer on the graded interlayer using a spray gun, said abradable top layer comprising zirconia, wherein the distance between the gun and surface to be coated is held constant during deposition of the abradable top layer, wherein each layer comprises vertical segmentation, as well as powder particles which are spherical and hollow, prior to deposition, for increased abradability.

2. The method of claim 1 wherein the distance between the gun and the surface to be coated is held constant at about 3.25 inches during deposition of the graded interlayer and deposition of the abradable top layer.

3. The method of claim 1 wherein the segmented abradable ceramic coating system includes between about 4 and about 8 vertical microcracks per inch.

4. A method of producing a segmented abradable ceramic coating system including a base coat foundation layer, a graded interlayer, and an abradable top layer, said method consisting essentially of:

applying the base coat foundation layer on a MCrAlY bondcoated metallic substrate using a spray gun, said base coat foundation layer consisting essentially of between about 7 weight percent and about 12 weight percent yttria stabilized zirconia, wherein the distance between the gun and surface to be coated is varied in increments from a starting distance of about 2 inches to an end distance of about 5 inches during deposition of the base coat foundation layer to produce the base coat foundation layer having a thickness of between about 5 mils and about 15 mils;

applying the graded interlayer on the base coat foundation layer using a spray gun, said graded interlayer consisting essentially of a compositional blend of the base coat foundation layer and the abradable top layer; wherein the distance between the gun and surface to be coated is held constant during deposition of the graded interlayer, said graded interlayer having a starting deposited composition of substantially the composition of the base coat foundation layer and is continuously graded to an end composition of substantially the composition of the abradable top layer, said graded interlayer having a thickness of between about 3 mils and about 10 mils; and applying the abradable top layer on the graded interlayer using a spray gun, said abradable top layer consisting essentially of a blend of 7 weight percent yttria stabilized zirconia and 20 weight percent yttria stabilized zirconia and is sufficiently soft to allow blade tips to cut into the abradable top layer and provide sealing, wherein the distance between the gun and surface to be coated is held constant during deposition of the abradable top layer, said ceramic coating system further comprising vertical segmentation and powder particles which are spherical and hollow prior to deposition.

* * * * *

UNITED STATES PATENT AND TRADEMARK OFFICE
CERTIFICATE OF CORRECTION

PATENT NO. : 5,705,231
DATED : January 6, 1998
INVENTOR(S) : Nissley et al.

It is certified that error appears in the above-identified patent and that said Letters Patent is hereby corrected as shown below:

Column 2, line 48, change "modem" to --modern--.
Column 4, line 51, change "densifted" to --densified--;
         line 65, change "Superior" to --superior--.
Column 6, line 65, change "™" to --®--.
Column 8, line 17, begin new paragraph with "Specifically";
         line 17, change "I" to --1--;
         line 28, begin new paragraph with "Layer";
         line 43, change "ca. scal" to --ea. seal--;
         line 45, change "scal" to --seal--.

Signed and Sealed this

Sixth Day of July, 1999

Attest:

Q. TODD DICKINSON

*Attesting Officer*     Acting Commissioner of Patents and Trademarks